United States Patent [19]

Derks

[11] 4,048,729

[45] Sept. 20, 1977

[54] ELECTRICAL TEACHING SYSTEM

[75] Inventor: Harry G. Derks, Holland, Mich.

[73] Assignee: Fleetwood Furniture Company, Zeeland, Mich.

[21] Appl. No.: 666,076

[22] Filed: Mar. 11, 1976

[51] Int. Cl.² .............................................. G09B 5/04
[52] U.S. Cl. ..................................... 35/8 A; 35/35 C
[58] Field of Search ................... 35/35 C, 8 A, 48 R, 35/48 B, 9 R, 9 A; 340/311, 286; 325/53, 55, 269; 343/208; 179/1 DD, 1 MN, 2 E, 82

[56] References Cited

U.S. PATENT DOCUMENTS

| | | | |
|---|---|---|---|
| 2,858,420 | 10/1958 | Lutz | 325/55 |
| 3,043,916 | 7/1962 | Sneath | 179/82 |
| 3,045,065 | 7/1962 | Metzner et al. | 179/1 |
| 3,069,789 | 12/1962 | Knight et al. | 35/35 C |
| 3,114,142 | 12/1963 | Bode et al. | 340/311 |
| 3,122,847 | 3/1964 | Redfield et al. | 35/35 C |
| 3,166,859 | 1/1965 | Alter | 35/35 C |
| 3,175,191 | 3/1965 | Cohn et al. | 340/311 X |
| 3,200,516 | 8/1965 | Parker | 35/35 C |
| 3,210,665 | 10/1965 | Street | 325/55 |
| 3,224,115 | 12/1965 | Auernheimer | 35/35 C |
| 3,267,591 | 8/1966 | Locke et al. | 35/35 C |
| 3,445,848 | 5/1969 | Goldstein | 343/225 |
| 3,491,464 | 1/1970 | Gray | 35/48 R |
| 3,546,791 | 12/1970 | Koos et al. | 35/9 R |
| 3,596,181 | 7/1971 | Dowling et al. | 325/55 |
| 3,623,242 | 11/1971 | Hoover | 35/35 C |
| 3,810,316 | 5/1974 | Lahlou | 35/8 A |

FOREIGN PATENT DOCUMENTS

| | | |
|---|---|---|
| 1,189,128 | 4/1970 | United Kingdom |
| 1,078,296 | 8/1967 | United Kingdom |

Primary Examiner—William H. Grieb
Attorney, Agent, or Firm—Price, Heneveld, Huizenga & Cooper

[57] ABSTRACT

A wireless electrical teaching system includes an instructor operated console with a plurality of lesson sources and means for transmitting the lesson source information to students, each having a transceiver unit which can be used to select one of the desired lesson sources. The console includes means for generating a unique student identification code transmitted on a common carrier frequency for all students but identifying an individual student for purposes of monitoring the student's progress during a lesson or for intercommunications between the instructor and a student. Each of the student transceivers include code detecting means responsive only to the unique code indentifying the student for generating a control signal which actuates a student transmitter for transmitting the student's voice back to the instructor during a monitoring mode of operation. The console also includes an intercom transmission circuit and a circuit for modifying the student code. The student's transceiver includes control means for automatically muting the lesson source when a modified code is received and tuning the student receiver to the intercom transmission circuit pemitting intercommunications between the instructor and the student at the same adjustable audio level as the lesson source selected by the student.

17 Claims, 5 Drawing Figures

ELECTRICAL TEACHING SYSTEM

BACKGROUND OF THE INVENTION

The present invention relates to teaching systems and particularly to improvements to wireless teaching systems.

In recent years electrical teaching systems have found considerable application in the teaching environment and particularly in language labs where the student is required to listen to spoken foreign languages to learn the proper pronunciation and in turn practice such pronunciation. Typically this is accomplished by microphones and headsets such that the student can also hear his or her pronunciation and compare it with that if the lesson source. Language labs and other teaching systems frequently must provide the same lesson material for several students while at the same time providing different lesson sources for other students who utilize the facilities.

There exists several systems capable of this basic operation, some of which are directly wired units such as represented by the U.S. Pat. No. 3,200,516 issued on Aug. 17, 1965, to D. O. Parker and assigned to the present assignee. Wired systems although adequate for providing the teaching functions, require considerable installation expense and lack the flexibility of wireless systems which permit relatively easy installation are portable and can be moved from classroom to classroom if desired. Several wireless type systems have also been developed in recent years. U.S. Pat. No. 3,122,847 issued Mar. 3, 1965, to R. H. Redfield et al and U.S. Pat. No. 3,623,242 issued Nov. 30, 1971, to E. L. Hoover, are representative of wireless systems. Although these wireless systems represent a significant advantage and improvement over systems which must be directly wired between the instructor's console and the student's units; the prior art wireless systems have required a plurality of operating frequencies to provide intercommunication and monitoring of the student by the instructor. Thus, for example, in the above noted Hoover patent each student has a predetermined assigned frequency unique to the student requiring at the instructor's console, a plurality of oscillators such that the frequency of the instructor's transmitter must be changed each time the instructor wishes to either monitor or intercommunicate with one of the students. Such an arrangement using multiple frequencies, one for each student in the system, by virtue of its relatively complex circuitry with multiple crystal oscillators and matched crystal filters can be costly to manufacture and failure prone.

SUMMARY OF THE INVENTION

Thus there exists a need for an improved electrical teaching system of the wireless type which eliminates the utilization of a plurality of frequencies for the student-instructor monitoring and intercommunications. Further, there exists a need for a system with greater flexibility as to the functions it can perform. These needs are met by the system of the present invention which provides a wireless electrical teaching system in which the instructor's console includes transmitting means for intercommunicating with each of the students on a frequency common to all students and for receiving, monitoring and intercommunications information from each of the students also on a common frequency. In order to selectively intercommunicate with or monitor an individual student a unique digital coding system is employed whereby each student's transceiver unit includes a code detecting means responsive only to a predetermined code for transmitting monitoring information to the instructor or responsive to a modified code for muting the received selective lesson source and receiving communications from the instructor thus providing intercommunications between the student and instructor. Such a system, therefore, eliminates the requirement of up to 30 or more separate frequencies required by the prior are systems for monitoring and intercommunication between the instructor and the students and thereby greatly simplifies the electrical circuitry required. Further, the system of the present invention offers several additional functions not available in existing wireless teaching systems.

These and other features and advantages of the system of the present invention can best be understood by referring to the following description thereof, together with the accompanying drawings in which:

DETAILED DESCRIPTION OF THE PREFERRED EMBODIMENT

Figure 1:
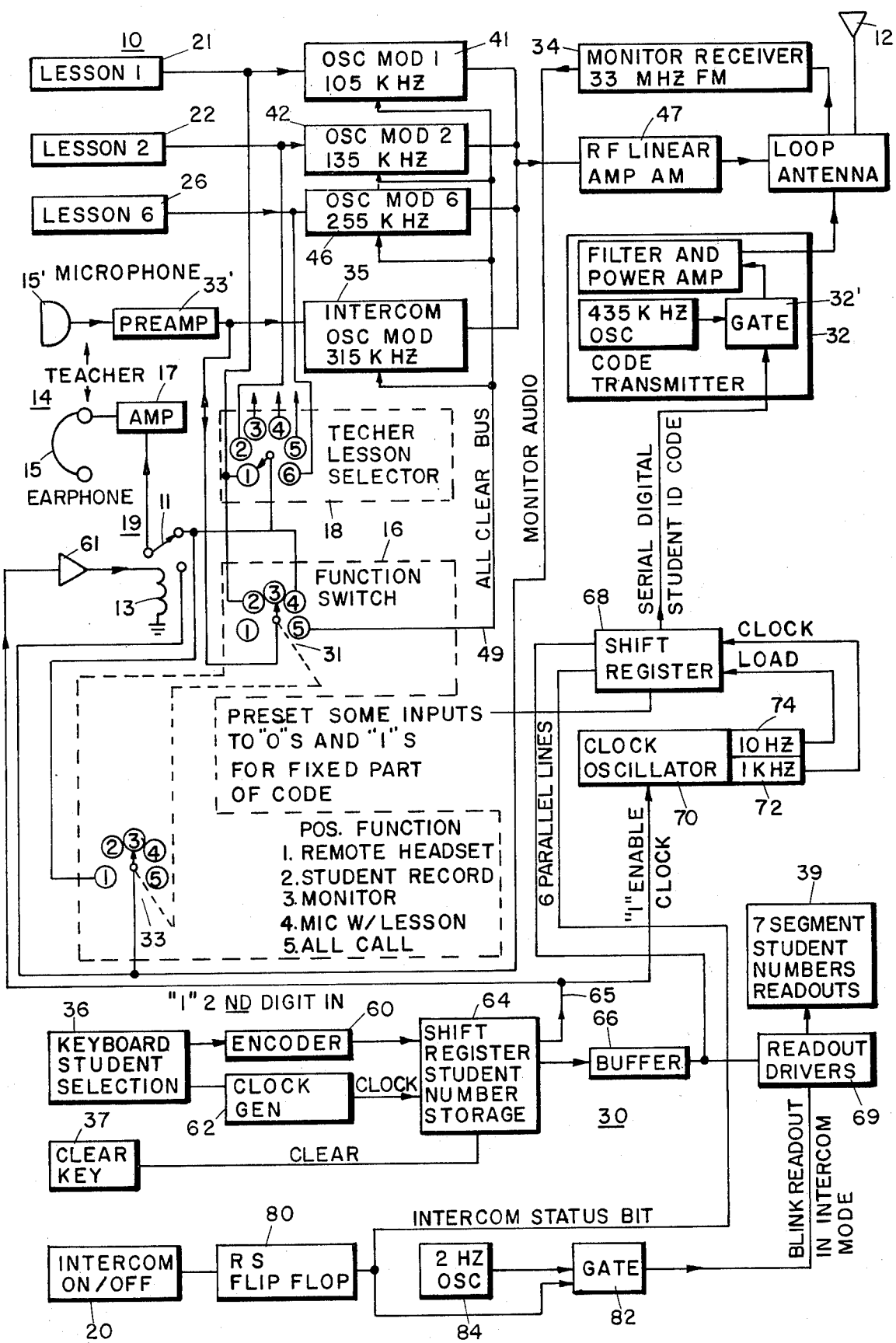
FIG. 1 is an electrical circuit diagram in block and schematic form showing an instructor's console embodying the present invention.

Before discussing the electrical circuitry employed in the system of the preferred embodiment in detail, a brief overview of the entire system and its operation is presented. The instructor's console shown in FIG. 1 is employed to provide a plurality of lessen sources indicated generally as circuits 10 in FIG. 1 which are coupled to a single loop antenna 12 for transmitting at 30 KHz intervals, low-frequency frequency amplitude modulated for form each of a plurality of lesson source channels. The instructor's console includes a headset generally indicated at 14 and selector switches 16 and 18 for selecting a desired control function, an intercom control switch 20 is provided and when actuated a low frequency amplitude modulated intercom signal is generated by the instructor's headset 14 and oscillator 35. The lesson source and intercom low frequency signals are applied to linear RF amplifer 47 coupled to antenna 12 for transmission. also included in the instructor's console is a student I.D. code generating circuit means 30 for supplying an instructor selected binary student identification code to a code transmitter 32. Code transmitter 32 is modulated in the CW mode to provide the binary student identification code transmitted by antenna 12. An FM receiver 34 coupled to the antenna 12 receives signals transmitted from a transmitter 46 (FIG. 2) included in the student transceiver shown in FIG. 2 and applies the received signals to the instructor's headset 14 through the function switch 16 and associated control circuitry. Thus, the instructor's console includes transmitting means for the lesson source, the instructor's comments which can be selectively sent to one or more students, and the student identification code generated by the circuitry 30 by actuation of a keyboard 36 controlled by the instructor. The instructor console further includes means for receiving signals transmitted by a selected student permitting monitoring of a student or intercommunications between the instructor and the student.

Figure 2:
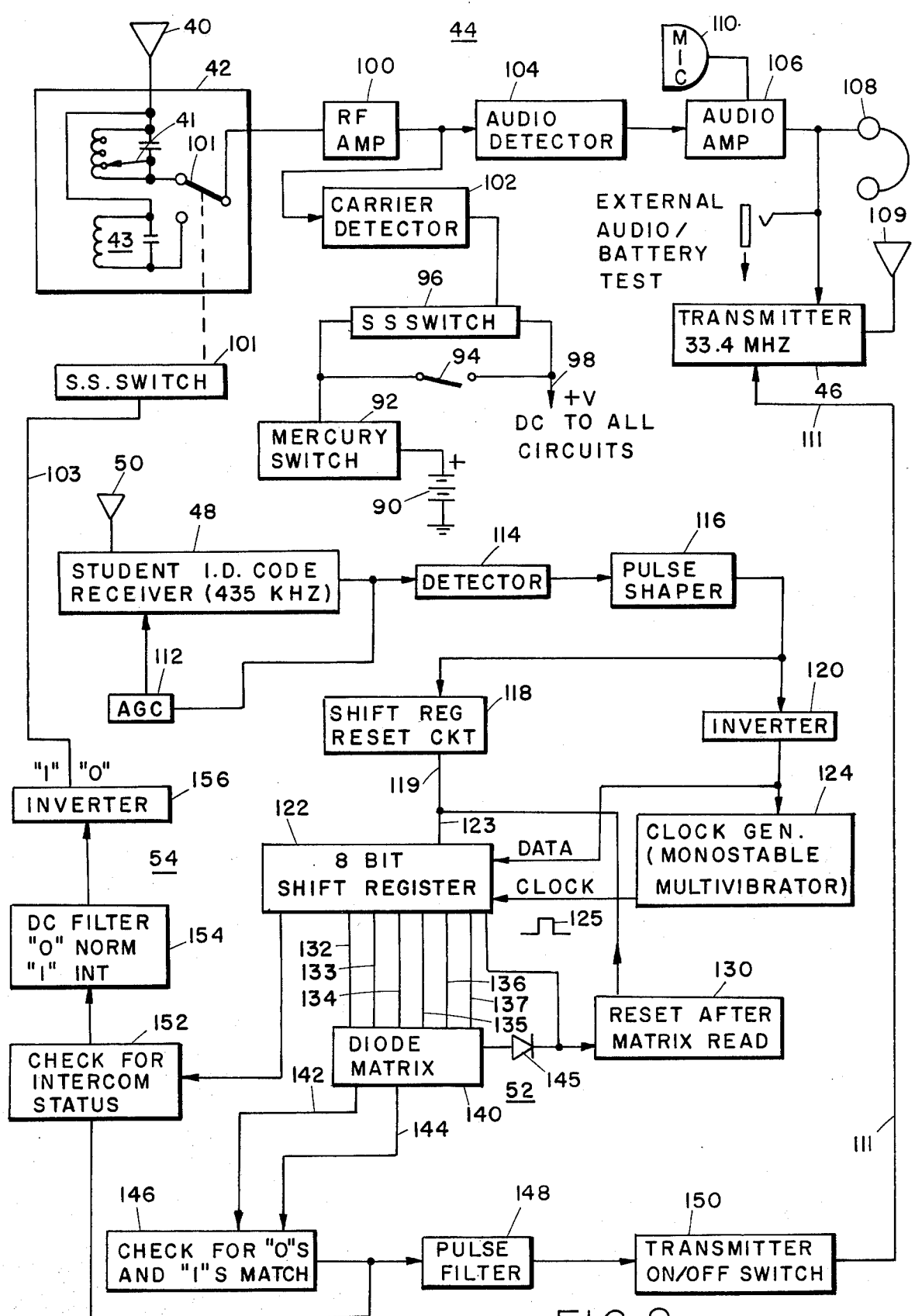
FIG. 2 is an electrical circuit diagram partly in block and schematic form showing one of the student transceiver units embodying the present invention.

Each of the student units include the circuitry shown in FIG. 2 and a system can contain any desired number of such student units which are manufactured to be incorporated in an integral headset with the circuitry being mounted on relatively small printed circuit boards incorporating integrated circuits. The student receiver includes a receiving antenna 40 coupled to a tuner 42 employed for selecting a desired lesson source for monitoring by the student and automatically actuated by receipt of an intercom control signal to mute the lesson source and retune circuit 42 to the instructor's intercom transmitting frequency. Each of the student units also include earphones 108 to which an FM transmitter 46 is coupled for transmitting student voice information from microphone 110 and lesson being monitored to the instructor's receiver 34. Transmitter 46 is actuated by the receipt of the student I.D. code for the particular student unit through a student code receiver 48 coupled to a receiving antenna 50. A code detecting circuit 52 in FIG. 2 provides a control signal via line 111 to transmitter 46 only when a code unique to the particular student transceiver has been generated by the instructor at keyboard 36 and transmitted through the code transmitter 32. Also in intercom control signal detecting circuit 54 is included for detecting the existence of an intercom control signal to actuate tuner 42 to receive only the intercom frequency and disconnect the student's lesson source thus permitting intercommunication between the instuctor and the student. Having briefly described the basic elements of the instructor console and each of the student transceivers, a detailed description first of the instructor's console is presented followed by a detailed description of one of the student transceivers employed in the system.

The instructor console includes several controls operated by the instructor and accessible form a front panel. These controls include a lesson selector switch 18 which is a single pole six position switch coupling the earphones 15 of headset 14 to any of one of the lesson sources 21 through 26 by means of an amplifier 17 and a relay 19. Relay 19 includes single pole, double throw contacts 11 and a relay coil 13 actuated as described in detail below for selectively coupling the input of amplifier 17 to switch 18 onto a switch 33. In the position shown for switch contacts 11 the instructor can select any one of the six lesson sources illustrated in the preferred embodiment for coupling to the headphones 15 to monitor the lesson source material of a selected channel. It is understood that while six lesson sources are illustrated in the preferred embodimemt, greater or fewer lesson sources could be employed.

Additionally the front panel controls include a function switch 16 which is double pole five position rotary switch having a first section 31 with a common contact coupled to the microphone 15' associated with the instructor's headset 14 through a preamplifier 33'. The output of preamplifier 33' is also coupled to an intercom oscillator and modulator 35 which in the preferred embodiment operates at 315 KHz. The output of modulator 35 is coupled to the input of the R F linear amplifier 47 in turn coupled to antenna 12. Contact 2 of switch section 31 is coupled to contact 1 of switch 18 permitting as described in greater detail below, the utilization of a tape cassette or the like used as lesson source 21 for recording of information from a student if desired. Contact 4 of switch section 31 is coupled to the common contact of lesson selector switch 18 and permits the coupling of the output from preamplifier 33' to any one of the selected lesson sources permitting the instructor to talk on top of the lesson source material. Contact 5 is coupled to a bus line coupled to all lesson source modulators 41–46 and intercom modulator 35 permitting the instructor to simultaneously speak to all students.

The second section 33 of function switch 16 has its common contact coupled to the relay switch 11 associated with relay 19 such that the instructor can, when switch 16 is in position, couple the input from one of the student transceivers received by receiver 34 through one or more of the selected lesson sources 1 through 6 in the preferred embodiment to permit the instructor to move around the classroom and talk over a selected lesson source channel utilizing a portable student transceiver as the source of information.

Additionally the front panel controls include a digital keyboard 36 permitting the instructor to key in a student number identifying a particular student to be monitored or to which the instructor wants to communicate in the intercom mode if the intercom switch 20 is additionally actuated by the instrctor. A clear key 37 permits the instructor to clear the selected student when the monitoring or other function is completed. The front panel control for the instructor also includes a display unit 39 including a light emitting diode and digital display of the selected student number which operate in a flashing mode or non-flashing mode indicating respectively that a student is monitored or that the system is in the intercom mode of operation.

The lesson sources 21 through 26 can be a cassette tape unit, a reel-to-reel tape unit or phonograph turntable or a combination of these or other conventional sources of electronic signals to be transmitted to students using the system. Each of the lesson sources 21 through 26 are coupled to associated oscillator and modulator units 41 through 46 respectively which are low frequency oscillators having a frequency separation of 30 KHz with oscillator 41 tuned to 105 KHz and oscillator 46 at 255 KHz. This frequency separation has been found successful in providing the desired separation between the lesson source channels. Each of the oscillators 41 through 46 are coupled to the R F linear amplifier 47, which due to the fact that it operates in a linear mode, can simultaneously amplify the various carrier frequencies together with the amplitude modulated audio information from the lesson sources and apply the signals to the common loop antenna 12 serving as the transmitting and receiving antenna for the instructor console. Also coupled to each of the modulators 41 through 46 is all-call bus line 49 coupled to function switch 16 section 31 contact 5. As noted above in this switch position, the instructor can simultaneously speak to all of the students through microphone 15'.

In the event the instructor wishes to monitor a student's progress by for example listening to the student's repetition of the pronunciation of a foreign lanuage, all that is required of the instructor is that the student's identification number be entered into the keyboard 36.

This activates the code generating means 30 to supply a unique code associated with the student so identified to transmitter 32. The code is received by the student's transceiver for actuating the transmitter portion of the student's transceiver to tramsmit the student generated voice information received by the antenna 12 and coupled by receiver 34 and applied to the instructor's headphone 15 through relay contacts 11. A detailed description of the circuits employed for the generation of the unique student identification code is now presented with reference also to FIGS. 2 through 5.

In order for the instructor to monitor a select student's progress, switch 16 must be in position 3 or the monitor which is its normal location. To initiate the monitoring mode and generation of the student identification code, the instructor then actuates keyboard 36 which includes digits 1 through 7 and 0 in the preferred embodiment. The keyboard also integrally includes the clear key 37. Inasmuch as a six bit student identification code is employed with two separate digits assigned for each student, the student identification numbers are 00 through 07, 10 through 17 and so forth up to 70 through 77. Thus the system accommodates up to 64 students. Clearly an additional two bits of code could be added such that an eight instead of a six bit two-digit student identification code could be employed. In such case 256 students would be accommodated by the system. In the preferred embodiment, however, the utilization of a system for 64 students was found to be adequate for nearly all applications.

When the instructor actuates the first number key of the student identification number, the keyboard having its output coupled to an encoder 60 supplies the encoder with a signal and actuates a clock generator 62 such that a three bit binary signal from the output of the encoder representative of the first number is entered into a shift register 64 coupled to the encoder. The shift register has the capability of receiving four binary bits with the remaining bit (not employed as for the student identification number) being employed to generate an enable signal once the second student identification number has been actuated by the instructor. The second key of keyboard once actuated causes the generation by encoder 60 of a second three bit binary number supplied to shift register 64 and also causing an output binary 1 from the extra bit position in the shift register to be applied to output line 65 from the shift register 64. Simultaneously the six bit student identification number is applied to buffer circuits 66 coupled to shift register 64 and to an output shift register 68 such that the student identification number can be serially outputted from register 68 and transmitted by the code transmitter 32. In the preferred embodiment encoder 60 was a 74148 decimal to binary encoder which is commercially available. Shift registers 64 and 68 were two CD4015 and four CD4014 integrated circuits respectively which are commercially available from RCA Corporation.

The binary 1 from register 64 serves as an enable signal on line 65 and actuates relay 19 through amplifier 61 such that the instructor's earphones 15 are disconnected from a preselected lesson source through switch 18 and coupled to the monitor receiver 34. Additionally, the enable bit is applied to an enable input terminal of a clock oscillator 70 including a 1 KHz output 72 and a 10 Hz output 74. The 1 KHz clock output is applied to shift register 68 to sequentially output the student identification code selected when the keyboard 36 is actuated to generate the enable pulse on line 65. The 10 Hz signal causes the repetition of the transmission of the code at a frequency of 10 Hz to make certain that the code is received by the selected student and the student transceiver actuated.

Figure 3:
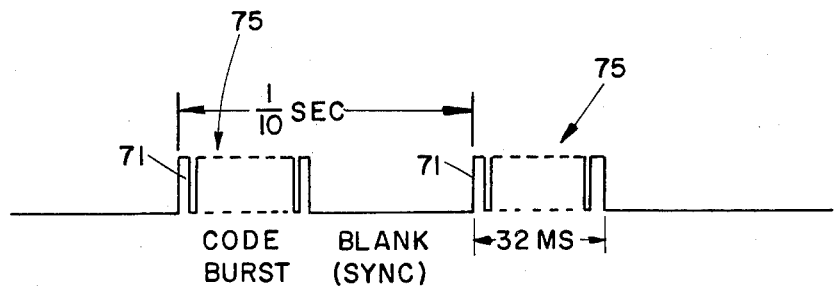
FIG. 3 is a waveform diagram showing the code employed with the system of the present invention.
Figure 4:
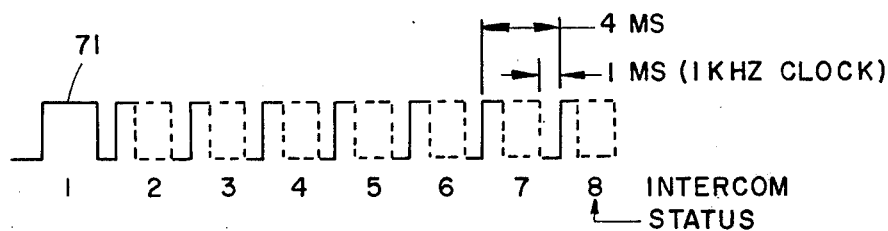
FIG. 4 is an expanded view of one of the code bursts shown in FIG. 3.
Figure 5:
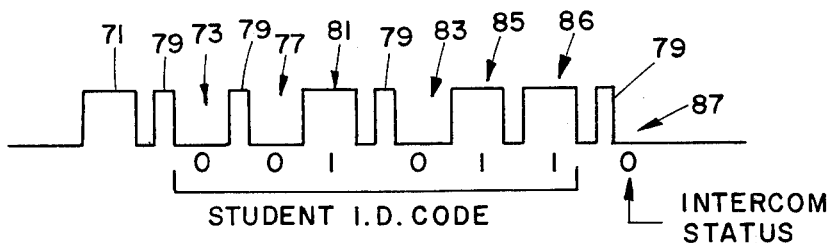
FIG. 5 is a waveform diagram showing a particular student identification code which is transmitted by the instructor console to monitor a particular student's progress or to intercom with the student.

The code format is shown in FIGS. 3 through 5 where in FIG. 3 two of a plurality of repeated code bursts 75 are shown. Bursts 75 have a frequency of 10 Hz and as seen in FIG. 4 each of the code bursts include eight bit intervals of four millisecond duration. The bit intervals are subdivided into one millisecond periods corresponding to the 1 KHz clock output frequency from circuit 72 of the clock oscillator 70. Inasmuch as each code burst 75 has eight four millisecond bit intervals, the total period for each of the code bursts is 32 milliseconds as shown in FIG. 3 while the total interval is 100 milliseconds. Accordingly, between each code burst is a blanking interval of 68 milliseconds. As seen in FIGS. 3 and 4, the first bit 71 of the transmitted code burst is always a binary 1 which is employed in conjunction with the decoding circuit in the student transceiver for controlling the reading of the code once the entire code burst has been received by the student receiver. This operation will be explained in greater detail below in conjunction with the description of the student transceiver unit.

The bit positions 2 through 7 constitute the six bit binary student identification code. The leading one millisecond portion of each of these code bits is also always at a binary 1 to actuate a delay in the student receiver causing the student decoder to look for the student code bits at a time period during the successive two millisecond intervals of each of the six student bit intervals. Thus the second and third millisecond of each of the six student I.D. bits can either be a binary 0 or a binary 1 depending upon the student selected by the instructor. The fourth bit of the four millisecond interval is a binary 0 corresponding to a blanking interval between adjacent bits. Finally the eight bit of the code burst also has a one millisecond binary 1 leading edge. The successive two millisecond period providing intercom status information and when at a binary 1 actuates the student receiver for the intercom mode of operation.

Referring now to FIG. 5 that is shown, the student identification code corresponding to student number 13 which includes a code reading flag 71 followed by two successive zero bits 73 and 77 each of which are proceeded by a bit reading flag 79, the last bit making up the most significant digit of the student identification number is a logic 1 bit 81. The least significant number (i.e. No. 3) comprises a zero bit 83 followed by two one bits 85 and 86 each of which integrally include the bit reading flag at the leading edge thereof. The intercom status bit 87 is a zero bit also preceeded by a bit reading flag 79, preceeded by 75.

Simultaneously with the entering of the student identification code into output shift register 68, it is applied to the digital display 39 through readout drivers 69 so that the instructor can visually check the accuracy of the student number selected for monitoring. As explained below, the repetitive transmission of the student identification code such as shown in FIG. 5 serves to actuate the transmitting portion of the student's transceiver unit so that the student's voice is received by the monitor receiver 34 and can be monitored by the instructor without the student's knowledge. Thus the instructor can ascertain the progress of the student in the lesson.

If the instructor desires to communicate on a two-way basis with the student, the intercom on-off switch 20 is actuated which is coupled to a set reset flip-flop 80 in turn coupled to the output shift register 68 to set the intercom status bit 87 at the one level instead of the zero level shown in FIG. 5. In addition the output signal from the circuit 80 is applied to an and gate 82 which also has an input coupled to a 2 Hz oscillator 84. When enabled by the output signal from circuit 80 gate 82 passes the 2 Hz signals from the oscillator to an inhibit control input of the readout driver circuit 69 causing the student identification digits to flash on the digital display thereby indicating to the instructor that two-way communication mode is in operation. In this mode the student's decoding circuit will detect the intercom status bit 87 at the logic level one thereby actuating the student's receiver such that the instructor's voice transmitted through microphone 15 through the intercom oscillator and modulator 35 to the antenna 12 through amplifier 47 can be heard by the student permitting, therefore, two-way communication between the instructor and student.

The code tramsmitter 32 employed in the instructor's console comprises a low frequency (i.e. 435 KHz) oscillator and power amplifier gated by the binary student I.D. code through a gate circuit 32, as seen in FIG. 1 to CW modulate the 435 KHz carrier frequency. This frequency is common to all of the student receivers for the code reception, as is the one KHz clock frequency defining the bit intervals for the student code. The instructor's console further includes conventional power supply means (not shown) for providing operating power to the circuits. The power requirement is relatively low since solid state integrated circuits are employed and the transmitters 32 and 47 are relatively low power.

The student transceiver unit shown in FIG. 2 includes a power supply comprising a battery 90 coupled to a mercury switch 92 which is positioned in the integral headset and circuitry to automatically open when the headset is placed in a horizontal position when laid on a desk or stored. When in position on the student's head, however, mercury switch 92 is closed and applies power either through the momemtarily actuated power switch 94 or through a solid state switch 96 to output terminal 98 which supplies D.C. operating voltage + V for the circuits within the student transceiver. In order to initially actuate the system, when a lesson source is being transmitted, switch 94 is momentarily actuated by the student thereby applying power to all the circuits. The lesson source selected by the rotary multiple position switch 41 (which can select any of the transmitted lesson sources 1 though 6) in the tuner 42 applies the received signal to an R F smplifier 100. The output of amplifier, which is coupled to a detector circuit 102 providing an output control signal to the solid state switch 96. Switch 96 then closes and completes the power supply current path through battery 90 mercury switch 92 switch 96 and to the output terminal 98. Upon receipt of the carrier associated with the lesson source therefore switch 96 will remain closed. Thus the system is self-latching once switch 94 is momentarily actuated. In the event the lesson is completed and the selected lesson transmission discontinued, the signal from circuit 102 actuates to open thereby removing power to the student's transceiver circuits.

Tuner 42 is coupled to the receiving antenna 40 for reception of the various lesson source signals selected by the rotary switch 41 changing the resonant frequency of the parallel L C circuits shown therein for the selection of a desired lesson source. The received amplitude modulated lesson information on the low frequency band spaced at 30 KHz intervals is applied to an amplifier 100 through switch 101 to an audio detecting circuit 104 and subsequently to an audio amplifier 106 and the headphone 108 of the student's headset 44.

Switch 101 is a solid state switch controlled by a signal on the input conductor 103 in response to the detection of an intercom status bit having a logic level 1 as noted above to change the state of switch 101 from the lesson source tuned circuit to a L C tuned circuit 43 which is tuned to the intercom frequency to 315 KHz. Thus when an intercom bit is detected by the student's transceiver, the lesson source is automatically muted and the intercom frequency transmitted by the instructor is received. Since the intercom mode is actuated only when the instructor has previously identified a student through selection by keyboard entry, the student transmitter 46 coupled to a transmitting antenna 109 has been actuated and the output from audio amplifier 106 generted by the student's microphone 110 will be transmitted to the instructor by the FM modulated 33.4 MHz transmitter 46. Transmitter 46 is actuated for transmission through a control signal applied to the transmitter via conductor 111. The code receiving and decoding circuit means in the transceiver employed to actuate transmitter 46 to provide monitoring or intercommunications is now described.

In order to receive the serially transmitted student identification code transmitted in the format shown in FIG. 3 through 5, a student I.D. code receiver 48 is tuned to the code frequency of 435 KHz in each of the student transceiver units. An automatic gain control circuit 112 is coupled between the output of receiver 48 and control input for maintaining the gain substantially constant. The code of the CW modulated code frequency is demodulated by detector circuit 114 having its output coupled to a pulse shaping circuit 116. The output signal from circuit 116 will be a logic zero or logic one level which corresponds to the transmitted student I.D. code. Circuit 116 is coupled to an input terminal of shift register reset circuit 118 comprising a filter circuit for providing a reset pulse during the blanking interval of 68 milliseconds shown in FIG. 3. The reset pulse is applied to output conductor 119 coupled to a reset input terminal 123 of shift register 122.

The binary output signal from circuit 116 is also applied to an inverter circuit 120 for proper phasing of the data; then applied to the data input of the eight bit shift register 122. Shift register 122 thus receives the code data from inverter 120 and receives reset pulses at input 123 also coupled to the output of a reset-afterread circuit 130. A clock generating circuit 124 responds to each of the code flag pulses (79 in FIG. 5) to generate a two millisecond delayed clock pulse 125 (FIG. 2) applied to the clock pulse input to shift register 122. Pulse 125 operates as a flag and data reading pulse to cause the shift register to look at the incoming data from the output of inverter 120 only during the second and third pulse intervals of the student identification code portion of the transmitted code burst.

Circuit 130 responds to the code flag bit 71 when shifted to the end of register 122 to immediately reset the shift register thereby increasing the noise immunity of the system. In some circuit arrangements, this circuit could be eliminated with circuit 118 providing the only required reset signal for the shift register. By providing circuit 130, however, the possibility of noise triggering the shift register 122 is greatly reduced. This assures that the transmitted code is accurately read and entered into the shift register by, in effect, looking at a code bit at the middle of its duration. Such a detecting arrangement, together with the repetitive code transmission, minimizes errors due to noise and other causes which may affect the leading and trailing edges of a code pulse.

The shift register 122 receives the serial data from the inverter 120 clocked in by the series of code bit flag pulses 125 from generator 124 and provides a parrallel six bit student I.D. code output at output lines 132 through 137 in response to the serial input code. The received code provided at the output of circuit 122 is decoded in part by a diode matrix 140 having six input terminals which are applied to a hard wired diode matrix coupled to the outputs of the shift register 122. Circuit 140 includes a plurality of diodes including diodes having an anode coupled to each of the lines 132 through 137, which for a given student transceiver and I.D. code will be at "0", and diodes having a cathode coupled to these lines should be at a logic "1" when the code unique to the student transceiver is received. This arrangement permits parallel reading of the code bit and when the assigned code is received, the output 142 of circuit will be a logic 0 and the output 144 a logic 1.

The diode matrix 140, therefore, serves as a decoder for the student code stored in the eight bit shift register 122. It is noted that register 122 will receive all student codes transmitted by the instructor but only the unique code associated with a particular student transceiver will actuate the diode matrix 140 to provide the desired control output signals on conductors 142 and 144. Conductors 142 and 144 are coupled to a gate circuit 146 such that when line 142 is zero and line 144 is one, a control output signal is generated. This signal is applied to pulse filter circuit 148 to convert the positive output pulses which occur at the 10 Hz frequency. Circuit 148 is an RC and diode network forming in effect a delayed DC switch responding to the received pulses to provide a steady state DC output level applied to a transmitter, a solid state on-off switch 150. The output of switch 150 is coupled to conductor 111 coupled to the FM transmitter 46 for actuating transmitter 46. The transmitter then transmits the 33.4 MHz FM modulated student voice information from microphone 110 to the instructor's receiver 34 (FIG. 1) when the unique student I.D. code is received by code receiver 48.

The last bit of the student I.D. code is the intercom status bit 87 and is also stored in shift register 122. This bit is applied to gate circuit 152 via conductor 151. Gate circuit 152 is enabled by the output signal from gate 146 when the student has been identified by the unique student I.D. code. In the event the instructor has further actuated the intercom switch 20 (FIG. 1) the binary one intercom bit applied to gate 152 will be applied to a second pulse filter 154 providing in response to the 10 Hz pulse frequency, a DC output signal applied to inverter circuit 156 and subsequently applied to solid state switch 101 by conductor 103. This signal actuates the switch 101 for switching tuner 42 to the intercom frequency of 315 KHz transmitted by the instructor. Thus the student and instructor can intercommunicate only when the instructor actuates both the student I.D. code and the intercom switch.

In addition to the monitor and intercom modes of operation both operable by the teacher by positioning function switch 16 at the position 3, the system permits use of a student transceiver as a remote transmitting source by the instructor. For this operation switch 16 is moved to position 1, and the instructor enters the student transceiver identification number on keyboard 36. In position 1 of switch 16 the signal received by the monitor receiver 34 from the selected student transceiver is applied via switch 18 to a desired lessor source channel in the same manner as the instructor can talk over a lesson if the switch 16 is in position 4. The only difference being that instead of utilizing the instructor's headset 14, the student's transceiver can be utilized permitting the instructor to move about the classroom.

In the student record mode of operation corresponding to position 2 of function switch 16, one of the lesson sources (and in the preferred embodiment lesson source 1) is utilized as a recorder instead of a playback mechanism with the output of monitor receiver 34 being coupled to lesson source 1 for recording with such an arrangement; naturally the lesson source employed by the entire classroom would not include lesson source 1 which would be utilized only for recording selected student's responses. In order to select a student for recording, the instructor merely follows the same procedure used for monitoring namely the insertion of the student's identification number into the keyboard 36 which responds to automatically transmit the associated student I.D. code. When not used for recording, the device can be used as a normal lesson source.

Finally in the all-call mode of operation corresponding to position 5 of switch 16, the output of the instructor's amplifier 33' is coupled to the all-call bus thereby modulating over each of the lesson sources so that the instructor may speak to all of the students listening to a lesson source.

Thus it is seen that the system of the present invention provides a tremendous degree of flexibility of operation while at the same time requiring a minimum number of operational frequencies. It will become apparent to those skilled in the area that various modifications to the preferred embodiment described and disclosed herein can be made without departing from the spirit or scope of the present invention as defined by the appended claims.

The embodiments of the invention in which an exclusive property or privilege is claimed are defined as follows:

1. A wireless electrical teaching system comprising:
   a central console including lesson source means for providing electrical signals representative of a lesson including audio information to be transmitted, transmitter means coupled to said lesson source means for transmitting said electrical signals, said transmitting means including an antenna for the wireless transmission of said electrical signals; code generating means for selectively providing a plurality of serial binary codes, each code uniquely associated with a predetermined student transceiver, means coupled to said code generating means for transmitting on a single frequency and selected code, first receiver means for receiving on a single frequency audio modulated electrical signals transmitted by a student transceiver; and
   a plurality of student transceivers each including student receiver means for receiving said electrical signals from said lesson source means and said selected code, student transmitter means for transmitting audio information from a student employing one of said transceivers on a frequency to be received by said first receiver means of said central console, and decoder means coupled to said student receiver means and responsive to a predetermined code to actuate said student transmitter means such that an instructor can monitor information generated by a student by actuating said code generating means to effect transmission of a code associated with a selected student.

2. The system as defined in claim 1 wherein said code generating means generates a serial binary code having at least seven bits with a leading bit at a predetermined logic level and the successive six bits selected to uniquely identify a student transceiver and wherein said decoding means includes circuit means responsive to said leading bit to read a transmitted code only when the entire code has been received.

3. The system as defined in claim 2 wherein said console includes means coupled to said transmitting means for transmitting information from an instructor to at least one student and means for modifying a student identifying code to include an actuating signal and wherein each of said student tranceivers includes circuit means responsive to said actuating signal when a predetermined code signal is also received to tune said student receiver to said transmitter means for receiving information transmitted from the instructor on a frequency common to all student transceivers thereby permitting intercommunications between an instructor and a selected student.

4. The system as defined in claim 3 wherein said code generating means generates an eight bit code and wherein said modifying means is coupled to said code generating means for actuating said code generating means to supply as the trailing bit a predetermined logic level and each of said student transceivers include means for detecting said trailing bit and for actuating said student receiver.

5. The system as defined in claim 1 wherein said code generating means includes a keyboard, encoding means coupled to said keyboard for providing a binary code in response to a student identification number entered into said keyboard, storage means including a clock input terminal, said storage means coupled to said encoder for storing a binary code therefrom, a clock pulse generator having an output coupled to said clock input terminal of said storage means for supplying clock pulses to said storage means including an output terminal for providing output serial code bits representative of the stored code upon receipt of a clock pulse at a clock input terminal of said storage means, and said output terminal of said storage means is coupled to means for transmitting said code.

6. The system as defined in claim 5 and further including means for repetitively loading and outputting a code stored in said storage means such that the code is repetitively transmitted by said code transmitting means.

7. The system as defined in claim 6 wherein said console includes display means coupled to said keyboard for displaying to an instructor the student number entered in said keyboard.

8. The system as defined in claim 1 wherein said student receiver means includes a variable frequency tuner for selection of a lesson source for reception and a student code receiver, said student receiver having an output coupled to said decoder means.

9. The system as defined in claim 8 wherein said decoding means includes means for storing the serially received student I.D. code and logic curcuit means coupled to said storing means for developing a control output signal for actuating said student transmitter means only when a predetermined code is received.

10. In a electrical teaching system employing a plurality of student transceivers and a central console providing lesson source signals transmitted to said students, an improved system for monitoring a students's progress comprising:

said console including a code transmitting means for transmitting a plurality of student identification codes on a single carrier frequency and a console receiver tuned to a frequency common to transmitters in all student transceivers, and said student transceivers each including decoding means responsive to a unique code for actuating a transmitter included in said student transceiver to transmit information to said console receiver only when a code uniquely associated with a student transceiver is transmitted from said console, wherein said console includes an intercom transmitter and further including an intercom control circuit coupled to said code transmitting means for modifying the code transmitted thereby and wherein said student transceiver includes intercom detecting means responsive to the modified code and a control circuit coupled to said detecting means for tuning the receiver of said student transceiver to a frequency for reception of instructor information from said intercom transmitter.

11. The system as defined in claim 10 wherein said code generating means comprises a keyboard, an encoder coupled to said keyboard for supplying a unique binary ouput code when a student identification number is entered into said keyboard, and a parallel to serial code processing circuit coupled between said encoder and said code transmitting means to supply a serial digital student I.D. code to said transmitting means for transmission.

12. The system as defined in claim 11 wherein said code processing circuit includes shift register means coupled to a clock pulse generator and responsive to signals from said encoder and clock pulse generator to supply said serial digital student I.D. code.

13. The system as defined in claim 11 wherein said code processing circuit further includes means coupled to said shift register means for actuating repetitively said shift register means to repetitively output to said code transmitting means said serial digital code such that the code is repetitively transmitted by said code transmitting means.

14. The system as defined in claim 13 wherein said decoding means of said student transceiver includes a single frequency code receiver and a decoder circuit coupled to said code receiver, said decoder circuit including means for storing the serially received code and logic circuit means coupled to said storing means for providing a control signal for actuating said transmitter of said student transceiver only when a predetermined unique code is received.

15. For use in a wireless electrical teaching system which includes an instructor console providing transmitted lesson source information, a monitor receiver permitting the instructor to monitor a student's progress, and code transmitter for transmitting a selected one of a plurality of student I.D. codes on a common carrier frequency, an improved student transceiver comprising:

a headset including earphones and a microphone, a tuner for selecting a frequency for desired transmitted lesson source, selectively activated transmitter means coupled to said microphone for transmitting student voice information, a code receiver for receiving all student I.D. codes, a decoder circuit coupled to said code receiver for developing a control signal in response to a predetermined student I.D. code, and a transmitter control circuit coupled to said decoder circuit and to said transmitter means for actuating said transmitter means when a predetermined code is received wherein said tuner further includes means for tuning to an intercom frequency and said transceiver includes an intercom control circuit coupled to said decoder circuit and to said tuning means and responsive to an intercom code bit to tune said student transceiver to an intercom frequency upon receipt of any intercom bit by said tuner.

16. For use in a wireless electrical teaching system which includes a plurality of student transceiver units each having decoding means responsive to a predetermined student I.D. code and received on a frequency common to all student transceivers for actuating a student transmitter for permitting monitoring of a student's progress, an improved instructor's console comprising:

code generating means actuated by an instructor to provide a serial student I.D. code comprising a series of binary bits uniquely identifying a selected student said generating means further including means for selectively adding an intercom bit to a predetermined location with respect to said serial student I.D. code for actuating the student receiver to receive information transmitted by said intercom transmitting means, code transmitting means coupled to said code generating means for transmitting on a frequency common to all codes said student I. D. code, and instructor intercom transmitting means for transmitting on a single frequency information from an instructor to be received by a receiver portion of the student transceiver.

17. The improved instructor console as defined in claim 16 wherein said code generating means includes means for repetitively supplying said transmitting means with a student I.D. code to be transmitted.

* * * * *

UNITED STATES PATENT AND TRADEMARK OFFICE
CERTIFICATE OF CORRECTION

PATENT NO. : 4,048,729
DATED : September 20, 1977
INVENTOR(S) : Harry G. Derks

It is certified that error appears in the above-identified patent and that said Letters Patent are hereby corrected as shown below:

Column 1; line 15:
 "if" should be --of--

Column 1; line 23:
 "by the U. S." should be --by U. S.--

Column 2; line 11:
 "are" should be --art--

Column 2; lines 47 and 48:
 "low-frequency frequency amplitude modulated for form each of" should be --low-frequency amplitude modulated signals for each of--

Column 2; line 57:
 "also" should be --Also--

Column 3; line 33:
 "in" should be --an--

Column 3; line 45:
 "form" should be --from--

Column 3; line 48:
 "any of one of" should be --any one of--

Column 4; line 31:
 "instrctor" should be --instructor--

Column 5; line 5:
 "tramsmit" should be --transmit--

Column 5; line 6:
 "by the antenna" should be --by antenna--

UNITED STATES PATENT AND TRADEMARK OFFICE
CERTIFICATE OF CORRECTION

PATENT NO. : 4,048,729
DATED : September 20, 1977
INVENTOR(S) : Harry G. Derks

It is certified that error appears in the above-identified patent and that said Letters Patent are hereby corrected as shown below:

Column 5, line 14:
 "monitor which" should be --monitor position which--

Column 7; line 23:
 "tramsmitter" should be --transmitter--

Column 7; line 54:
 "smplifier" should be --amplifier--

Column 8; line 14:
 "to 315 KHz" should be --of 315 KHz--

Column 8; line 23:
 "generted" should be --generated--

Column 8; line 54:
 "reset-afterread" should be --reset-after-read--

Column 9; lines 11 and 12:
 "from the inverter" should be --from inverter--

Column 9; line 13:
 "parrallel" should be --parallel--

Column 10; line 10:
 "lessor" should be --lesson--

Column 10; line 62:
 "and" should be --any--

Column 11; line 67:
 "student receiver" (second occurrence) should be --student code receiver--

UNITED STATES PATENT AND TRADEMARK OFFICE
CERTIFICATE OF CORRECTION

PATENT NO. : 4,048,729

DATED : September 20, 1977

INVENTOR(S) : Harry G. Derks

It is certified that error appears in the above-identified patent and that said Letters Patent are hereby corrected as shown below:

Column 12; line 3:
"curcuit" should be --circuit--

Column 12; line 10:
"students's" should be --student's--

Column 12; line 12:
"including a code transmitting means" should be --including a code generating and code transmitting means--

Column 12; line 36:
"ouput" should be --output--

Column 12; line 67:
"and code" should be --and a code--

Column 13; line 4:
"for desired" should be --for a desired--

Signed and Sealed this

Fourteenth Day of March 1978

[SEAL]

Attest:

RUTH C. MASON
Attesting Officer

LUTRELLE F. PARKER
Acting Commissioner of Patents and Trademarks